(12) United States Patent
Grinspun et al.

(10) Patent No.: US 9,020,787 B2
(45) Date of Patent: Apr. 28, 2015

(54) METHODS, SYSTEMS AND MEDIA FOR SIMULATING CONTACT SCENARIOS

(75) Inventors: Eitan Grinspun, New York, NY (US); David Harmon, New York, NY (US); Rasmus Tamstorf, Los Angeles, CA (US); Paul E. Vouga, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 1109 days.

(21) Appl. No.: 12/707,492

(22) Filed: Feb. 17, 2010

(65) Prior Publication Data

US 2010/0211368 A1 Aug. 19, 2010

Related U.S. Application Data

(60) Provisional application No. 61/153,222, filed on Feb. 17, 2009.

(51) Int. Cl.
| | |
|---|---|
| G06F 7/60 | (2006.01) |
| G06F 17/10 | (2006.01) |
| G06G 7/48 | (2006.01) |
| G06F 17/50 | (2006.01) |
| G06F 17/12 | (2006.01) |

(52) U.S. Cl.
CPC ............ G06F 17/5009 (2013.01); G06F 17/50 (2013.01); G06F 17/5018 (2013.01); G06F 17/12 (2013.01); G06F 2217/16 (2013.01)

(58) Field of Classification Search
CPC . G06F 17/50; G06F 17/5009; G06F 17/5018; G06F 17/12

USPC .................................................. 703/6, 2, 7
See application file for complete search history.

(56) References Cited

U.S. PATENT DOCUMENTS

| 5,548,694 A * | 8/1996 | Frisken Gibson ............ 345/424 |
| 2006/0149516 A1* | 7/2006 | Bond et al. ......................... 703/6 |
| 2009/0105997 A1* | 4/2009 | Nagasaka ........................ 703/2 |

OTHER PUBLICATIONS

Bernhard Thomaszewski, NPL publication, "Asynchronous Cloth Simulation", May 2008.*
William Fong, NPL, "Stability of Asynchronous Variational Integrators", IEEE 2007.*
Peter Wriggers, NPL, "Analysis and Simulation of Contact Problems", Chap 2, 2006.*
Elaine Kieran, NPL, "Cloth Simulation", 2005.*
D. Durville, NPL, "Finite element simulaiton of textile materials at mesoscopic scale", Sep. 2007.*
Thomaszewski, NPL publication, "Asynchronous Cloth Simulation", May 2008.*
Robert Bridson, NPL, "Robust Treatment of Collisions, Contact and Friction for Cloth Animation", 2002.*
D. Durville, NPL, "Finite element simulation of textile materials at mesoscopic scale", 2007.*

(Continued)

*Primary Examiner* — Omar Fernandez Rivas
*Assistant Examiner* — Angel Calle
(74) *Attorney, Agent, or Firm* — Ference & Associates LLC

(57) ABSTRACT

Embodiments of the invention provide methods enabling reliable simulation of objects in contact scenarios. Embodiments of the invention utilize methods providing three parameter-independent guarantees. According to embodiments of the invention, simulations of well-posed problems: have no interpenetrations; obey causality, momentum and energy conservation laws; and complete in finite time.

14 Claims, 12 Drawing Sheets

(56) References Cited

OTHER PUBLICATIONS

Leonidas J. Guibas, NPL, "Kinetic Collision Detection: Algorithm and Experiments", IEEE 2001.*

International Searching Authority, Search Report for International Application PCT/US2010/024479, Jul. 7, 2010, 3 pages (EPO).

Thomaszewski, Bernhard, Pabst, Simon, Straber, Wolfgang, "Asynchronous Cloth Simulation", CGI 2008 Conference Proceedings 2008, XP002590810, Retrieved from the Internet URL:http://www.gris.uni-tuebingen.de/people/staff/spabst/pdf/Asynchronous_CGIFinal.pdf (retrieved Jul. 6, 2010).

Guibas, L. J., et al., "Kinetic collision detection: algorithms and experiments", Proceedings of the 2001 IEEE International Conference on Robotics and Automation, ICRA 2001, Seoul, Korea, May 21-26, 2001.

* cited by examiner

METHODS, SYSTEMS AND MEDIA FOR SIMULATING CONTACT SCENARIOS

CLAIM FOR PRIORITY

This application claims priority to U.S. Provisional Patent Application Ser. No. 61/153,222, filed on Feb. 17, 2009, and entitled "METHODS, SYSTEMS, AND MEDIA FOR SIMULATING CONTACT SCENARIOS", which is incorporated by reference herein.

STATEMENT OF GOVERNMENT INTEREST

This invention was made with government support under grant numbers: CNS0614770, CCF0643268, and IIS0528402, awarded by the National Science Foundation. The government has certain rights in the invention.

BACKGROUND

The subject matter described herein generally relates to simulating objects in contact scenarios. More particularly, the subject matter described herein relates to simulating objects, such as cloth and solids, realistically in complex contact scenarios while maintaining geometric safety, physical correctness, and computational progress.

Robust simulation of complex contact scenarios is critical to applications spanning a wide variety of areas, including for example graphics (training, virtual worlds, entertainment, et cetera) and engineering (product design, safety analysis, experimental validation, et cetera). Contact response is the part of the simulation that handles high-speed impact and resting contact. Challenging scenarios involve dynamics with frequent and distributed points of contact, interaction with sharp boundaries, resting and sliding contact, and combinations thereof. Useful resolution of these scenarios requires consideration of the fundamental issues of geometric safety, physical correctness, and computational progress. However, providing a method to ensure appropriate geometric safety, physical correctness and computational progress has proven difficult for a variety of reasons.

BRIEF SUMMARY

Embodiments of the invention provide methods enabling reliable simulation of objects in complex contact scenarios. Embodiments of the invention utilize methods providing three parameter-independent guarantees. According to embodiments of the invention, simulations of well-posed problems: have no interpenetrations; obey causality, momentum and energy conservation laws; and complete in finite time. Certain embodiments of the invention operate according to a synthesis of asynchronous variational integrators (AVIs), kinetic data structures (KDSs), and a discretization of the contact barrier potential by an infinite sum of nested quadratic potentials.

In summary, one aspect of the invention provides an apparatus for simulating contact between objects comprising: one or more processors; and a program storage device having a program of instructions executable by the one or more processors, the program of instructions comprising: computer readable program code configured to simulate a plurality of objects in one or more contact scenarios with: guaranteed geometric safety such that simulated object collision events are not missed and object interpenetration is prohibited; guaranteed physical correctness such that simulated object collision events obey causality and physical conservation laws; and guaranteed computational progress such that simulation of the simulated object collision events completes in finite time.

Another aspect of the invention provides a method comprising: utilizing one or more processors to execute a program of instructions for simulating a plurality of objects in one or more contact scenarios, the program of instructions comprising: computer readable program code configured to simulate a plurality of objects in one or more contact scenarios with: guaranteed geometric safety such that simulated object collision events are not missed and object interpenetration is prohibited; guaranteed physical correctness such that simulated object collision events obey causality and physical conservation laws; and guaranteed computational progress such that simulation of the simulated object collision events completes in finite time.

A further aspect of the invention provides a computer program product comprising: a computer readable storage medium having computer readable program code embodied therewith, the computer readable program code comprising: computer readable program code configured to simulate a plurality of objects in one or more contact scenarios with: guaranteed geometric safety such that simulated object collision events are not missed and object interpenetration is prohibited; guaranteed physical correctness such that simulated object collision events obey causality and physical conservation laws; and guaranteed computational progress such that simulation of the simulated object collision events completes in finite time.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
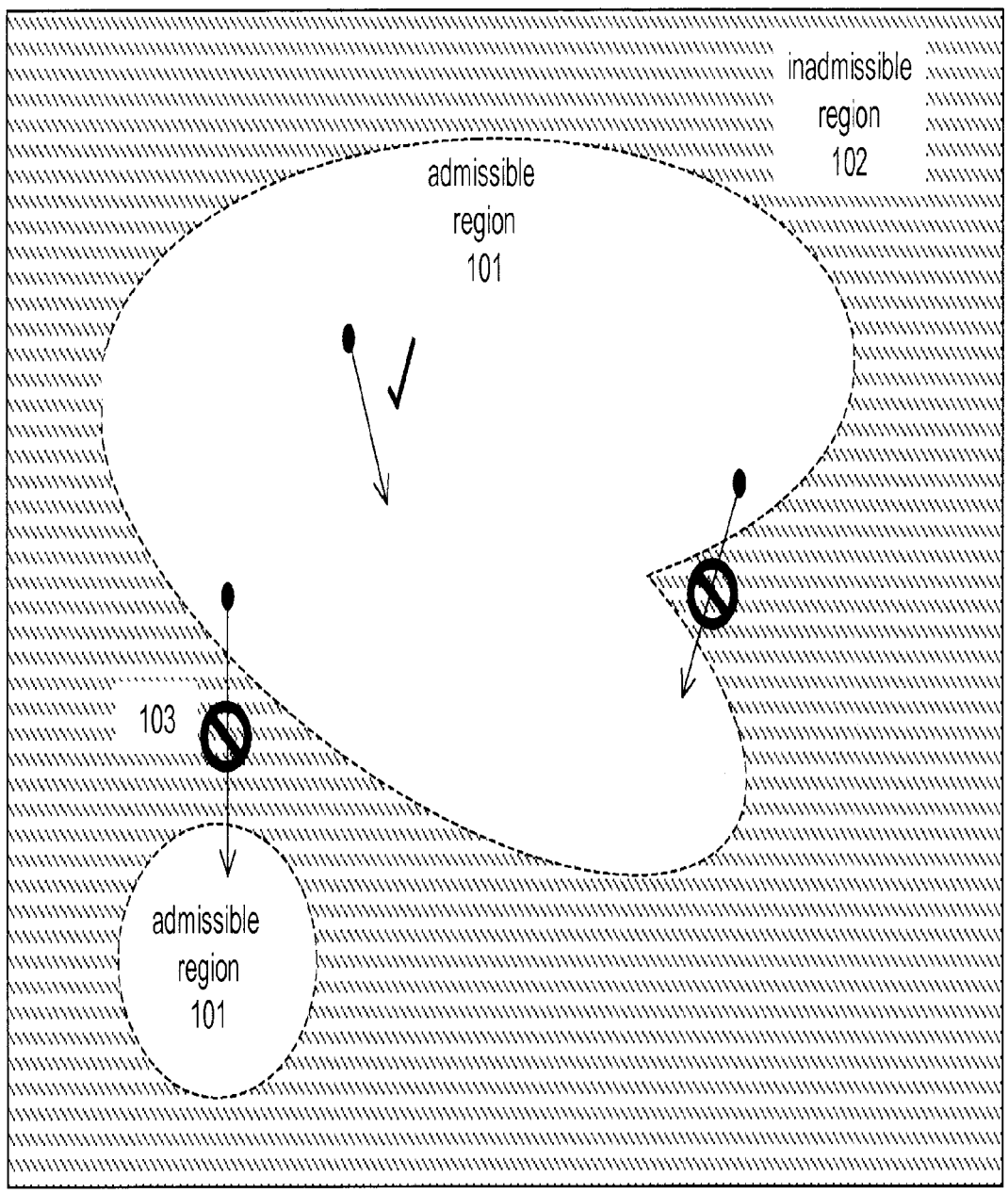
FIG. 1 illustrates permissible and impermissible physical trajectories.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention. For example, examples are given throughout focusing on the union of asynchronous variational integrators (AVIs) and kinetic data structures (KDSs), and employing a discretized contact barrier potential; however, these are utilized merely as exemplary ways in which various aspects of the invention may be implemented.

In this regard, reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

A more general description of exemplary embodiments of the invention is now provided. This general description is followed by a description having more specific but exemplary and non-limiting details with references to the attached figures.

Simulation of complex contact scenarios is useful in many applications. Because resolution of complex contact scenarios requires consideration of the fundamental issues of geometric safety, physical correctness, and computational progress, an ideal algorithm offers provable guarantees of safety, correctness, and progress.

A safety guarantee eliminates the need to iterate through the animation-design process because of unsightly penetration artifacts; such a guarantee should not fall on an overburdened user (via tunable parameters). A correctness guarantee is a prerequisite for physical behavior that is consistent under rediscretization of space and time. Respect for causality (step wise progression of events) is critical to capturing chain reactions and phenomena such as waves and stacking; discrete conservation laws allow for the development of tunable dissipation that does not "cross-talk" with parasitic numerical damping. If, however, these guarantees are not accompanied by guaranteed progress, the simulation may never complete, no matter how fast or parallel the hardware. Accordingly, embodiments of the invention utilize methods providing these parameter-independent guarantees of safety, correctness and progress.

Existing contact simulation models are less than satisfactory with respect to guarantees of safety, correctness and progress. Existing penalty models cannot guarantee geometric safety because they allow in some context interpenetrations, for example one object passing through another. Existing impulse models, such as iterated impulse and linear complimentarity models, which detect collisions between objects and instantaneously compute a correcting impulse, all have a common failing in that there is no valid impulse that is physically correct, which is particularly problematic for three-dimensional (3-D) contact simulation. Existing geometric models attempt to geometrically approximate collisions. While these approximations are fast, they are not physically correct. Thus, no existing model provides adequate guarantees of geometric safety, physical correctness and computational progress.

Accordingly, embodiments of the invention utilize contact simulation methods that place safety and correctness on an equal footing with progress. As a starting point, embodiments of the invention use barrier potential for collision response simulation, dictating a potential that diverges with proximity. Similar to an electrostatic potential, a barrier potential provides a guarantee of safety (no tunneling). Embodiments of the invention discretize this barrier potential to be able to guarantee progress. Because the second derivative of the potential, which controls the stable time step of an explicit integrator, diverges with proximity, an adaptive integration method is employed by embodiments of the invention. For this adaptivity, embodiments of the invention utilize asynchronous integration.

In order to appreciate more fully certain aspects of the invention, some of the shortcomings of synchrony are briefly reviewed. Most time integration methods are synchronous, moving the entire configuration forward in lockstep from one instant in time to the next. Such synchrony is fundamentally at odds with safety, correctness, and progress: the first two goals are assured by attending to collisions in order of causality, which can require arbitrarily small times steps. The number of possible impact events in a single "reasonable" time step can be enormous. Thus, it can be concluded for practical purposes that synchronous contact simulation approaches cannot exactly compute sequence and timing for all impacts.

For scenarios involving sharp boundaries or dispersed points of contact, asynchrony renders non-interpenetration and momentum conservation tractable. Because elements advance at their own pace, those elements not entangled in collisions can proceed at large time steps. The median time step of an asynchronous method can be moderate even when tight collisions force some elements to proceed at small time steps.

Embodiments of the invention utilize asynchronous variational integrators (AVIs), which belong to a larger class of integrators that exactly conserve both momentum and symplecticity (loosely related to areas in phase space). For example, the well-known Verlet ("leapfrog") integrator is symplectic; such integrators are highly regarded because of their provable approximate conservation of energy over long spans of simulated time. AVIs were previously demonstrated to enjoy these correctness properties while simultaneously allowing for efficient treatment of spatially non-uniform discretizations; however, a correct contact model remained unexplored. Embodiments of the invention now provide barrier potential discretization via discretizing divergent potential as an infinite sum of quadratic potentials. This is essentially a layered approach, with each penalty layer having a clock that can be integrated, with deeper layers having faster moving clocks.

While the AVIs will provide safety and correctness guarantees, acceptable computational progress is still a concern. Accordingly, embodiments of the invention utilize a method to reduce the computational overhead of infinitely many clocks into a set of finite active clocks that should be detected as active and accounted for during a simulation. That is, embodiments of the invention optimize away inactive penalty layers. Thus, a problem in mechanics, that is handling collisions with appropriate safety, progress and correctness, can be reformulated into a problem in computer science, that is, detecting which penalty layers are active and inactive.

In order to accomplish this, embodiments of the invention, rather than calculating an exact time for activating a penalty layer, employ a proof (referred to herein as a certificate) that the time for activation has not yet come to pass. So long as the proof is valid, activation is not required; whereas if the proof fails it can be updated and/or activation can take place.

To employ such a scheme, embodiments of the invention utilize kinetic data structures (KDSs). A KDS algorithm maintains a data structure governed by formal invariants describing some discrete attribute (such as absence of collisions) in response to the continuous movement of geometric elements. Many existing collision detection methods can be reformulated from a KDS perspective. The inventors have recognized that KDSs are particularly appropriate for asynchronous applications, because their focus on fast, minimal, "output-sensitive" data-structure updates makes them ideally suited for the small, local changes effected by each AVI step. While KDSs are the perfect suitor for AVIs, with KDSs' safety complementing AVIs' correctness, prior works have failed to consider such a combination.

As described further herein, embodiments of the invention: employ a contact model that is safe, independent of user parameters. Embodiments of the invention correctly discretize time using asynchrony to preserve the model's safety and to respect causality, using a symplectic-momentum integrator to exactly conserve momentum and approximately conserve energy over long run times. Also described herein are the basic foundations for the union of AVIs with KDSs, used herein as a non-limiting example for ensuring a tractable, safe, correct integration of complex contact for highly deformable objects.

Throughout this description, reference will be made to the APPENDIX, line numbers of which correspond to an exemplary process that summarizes an event-driven simulation loop. Rather than keeping the entire configuration synchronized in time, each vertex i stores its "most recently seen" position $x_i$ and velocity $\dot{x}_i$, as recorded at time $t_i$. Events, each embodying some simple local atomic action, are drawn and processed in causal order (see LINE 2). The state of all vertices in the stencil of this drawn event must be advanced to the current time (LINES 3-7). When a force event is drawn, impulses are applied to the local stencil of vertices (see LINE 9). Since the impulses affect the vertices' future trajectories, the continuous-time collision-detection data structures are updated (see LINES 11-14). Some events embody data structure certificate updates but do not affect the trajectory (see LINES 15-18).

The description now turns to the figures. The illustrated embodiments of the invention will be best understood by reference to the figures. The following description is intended only by way of example and simply illustrates certain selected exemplary embodiments of the invention as claimed herein.

Computational contact mechanics is a well-studied problem of constraint enforcement. Referring to FIG. 1, a physical trajectory travels only through the admissible region 101. The admissible region 101 corresponds to the subspace of collision-free configurations. Whereas the inadmissible region 102 precludes travel of the object, as it encounters contact with another object. Framing collision response as an instance of constraint enforcement enables generalizations, for example, inextensibility enforcement (discussed further herein).

To enforce constraints, engineers turn to penalty forces. Analysis begins with the impulsive penalty force, an infinite spike where bodies are in contact and zero elsewhere. The spike is impossible to model with a conservative force, necessitating approximation with quadratic or higher-order penalty potentials. In deviating from true impulses, penalty potentials permit visible penetration; stiffening the force helps, but it also induces smaller time steps. On the other hand, a low stiffness leads to disastrous tunneling 103 through the inadmissible region 102. These drawbacks motivate adoption of Lagrange multipliers and unilateral contact laws, where constraint-enforcing balances constraint-violating forces. Multiple simultaneous contacts induce linear complementarity problems (LCPs), with their attendant complexity and numerical pitfalls.

Graphics and robotics have embraced these developments, extending them with an eye to simplicity and efficiency. An attempt to directly incorporate collision algorithms into AVIs faces two challenges: many methods amortize cost by assuming temporal synchronization; a straightforward interleaving of contact-response and symplectic integration algorithms breaks the latter's good momentum and energy behavior.

Several works considered asynchronous handling of contact. What sets embodiments of the invention apart is the focal triad of safety, correctness, and progress. Methods that prioritize progress by relaxing correctness can have downstream costs of simulation setup, feature development, and artifact resolution. For example, many popular methods for cloth simulation justifiably assume a zero coefficient of restitution (COR). These assumptions can be so deeply ingrained that allowing adjustment of CORs is impossible without a major overhaul or painstaking parameter-tuning. As another example, local ("Gauss-Seidel" or "Jacobi") iterative techniques essentially optimize for the case of light collisions, resorting to (unphysical) "failsafes" in certain contexts.

In summary, conventional approaches in mechanics describe physical models for contact, but lack many of the sophisticated algorithms considered by computer scientists; meanwhile, the trend in graphics has been to start with a fast but approximate solution, and then to chip away at the "unphysical" artifacts and the lack of scalability. By contrast, embodiments of the invention begin with a more costly, but geometrically safe and physically conservative method, and build up efficiency using tools such as asynchrony.

Asynchronous Variational Integrators

Consider a mechanical system with a time-varying configuration $q(t)$ in the space Q of all configurations; concretely, for a mesh with vertices $x_1, \ldots, x_n$ in 3D $Q=\mathbb{R}^{3n}$ is represented by a vector of all the vertices' Cartesian coordinates. A dot denotes differentiation in time, so that $\dot{q}(t)$ is the configurational velocity. Let M be the mass matrix, so that $p=M\dot{q}$ is the momentum.

The Verlet integrator evolves a sequence of positions $q_0, q_1, q_2 \ldots$ and momenta $p^0, p^1, p^2 \ldots$ via the update rules:

$$q_k - q_{k-1} = hM^{-1}p^{k-1}, p^k - p^{k-1} = hF(q_k), t_k - t_{k-1} = h,$$

where h is the time step and F(q) is the force. The sub/superscripted indices allude to the method's alias, leapfrog, reminding that positions and velocities are staggered in time, with $t_k$ associated to $q_k$, and $(t_k, t_{k+1})$ associated to $p^k$. In effect, Verlet first updates the position at $t_k$ using the constant momentum associated to the preceding interval $(t_{k-1}, t_k)$ (LINE 5), and then impulsively "kicks," obtaining a new momentum for the following interval $(t_k, t_{k+1})$ (LINE 9), yielding a piecewise linear (p.l.) trajectory over the intervals $(t_k, t_{k+1})$. As a geometric integrator, Verlet tracks conservation laws (for example, mass, momentum, energy) and adiabatic invariants (for example, temperature) over long run times, and offers more consistency and qualitatively predictable behavior across a range of time step sizes.

AVIs naturally extend Verlet. Each force receives an independent, regular (fixed-rate) clock, fixed a priori by stability requirements. While impulses of a force are regularly spaced in time, the superposition of forces yields events irregular in time. As with Verlet, the trajectory is p.l., interrupted by "kicks." When their clocks are nested—as quarter notes are nested in half notes—AVIs reduce to an instance of multistepping methods. Developments utilized by embodiments of the invention apply to this family of methods.

For example, prior work assigned an elastic potential to each mesh element. Irregular meshes have spatially varying element shapes and corresponding time step stability restrictions; with AVIs, each element advances at its own pace. Since an elemental potential depends only on a local mesh neighborhood, each integration event is local, affecting the position and velocity of a small number of stencil vertices. Correspondingly, LINE 9 uses the local forces and mass matrix.

To schedule the interrupts to the p.l. trajectory, AVIs use a priority queue, conceptually populated with all event times until eternity. In practice, it suffices to schedule only the next tick for each clock, since that event can schedule the subsequent tock (LINE 10).

A more complete analysis leading to the geometric and conservation properties of AVIs invokes ideas from discrete mechanics and variational integration, which are not addressed in detail here. With regard to ensuring correctness, here it suffices to state that AVIs' remarkable properties are due to its multisymplecticity; the derivation requires each force to have a regular (constant-rate, ever-ticking) clock. Playing with this clock—accelerating or pausing—is strictly forbidden. Interrupting the p.l. trajectory with other mechanisms (for example, interleaving a velocity filter) breaks multisymplecticity. Prior work has proven that symplectic-momentum-energy preserving methods of regular time step do not exist (except for certain integrable systems); one cannot hope to interleave an energy-momentum collision integration with a symplectic-momentum force integration and retain either set of properties.

The problem of extending AVIs to handle contact mechanics is addressed herein and utilized by various embodiments of the invention. The conservation properties of AVIs rely on preservation of the multisymplectic fog in, and are easily broken by naively incorporating existing contact-resolution methods. A principled treatment considers a multi-symplectic formulation of contact mechanics, and an asynchronous computation of collision detection and response.

Discrete Penalty Layers (DPL)

Figure 2:
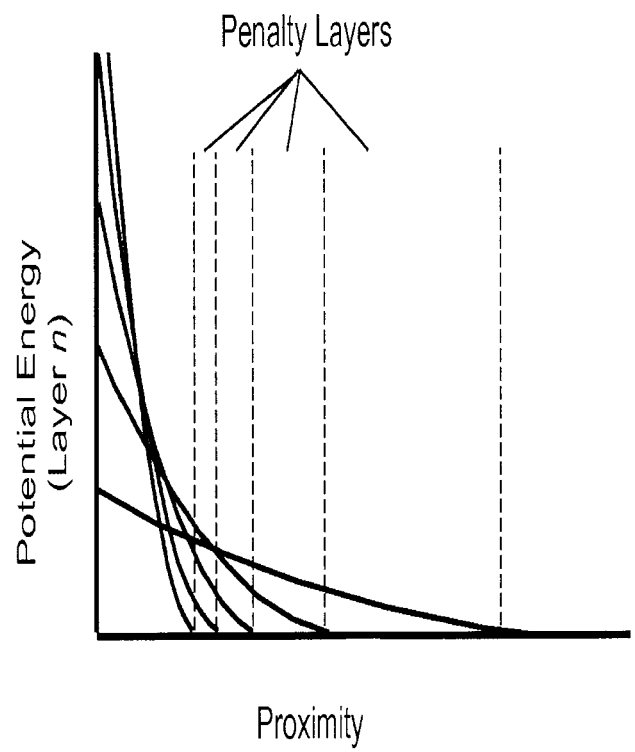
FIG. 2 illustrates potential energy as a function of proximity between objects.

Referring to FIG. 2, consider a simple penalty method that penalizes proximity between bodies $(x_a; x_b)$. For a given surface thickness $\eta$, the gap function $$g_\eta(q) = \|x_b - x_a\| - \eta$$

tracks signed proximity between moving points $x_a$ and $x_b$. When $g<0$, the points are said to be proximate. The contact (or "interaction") potential and force can be expressed in terms of g:

$$V_\eta^r(g(q)) = \begin{cases} \frac{1}{2}rg^2 & \text{if } g \leq 0 \\ 0 & \text{if } g > 0 \end{cases}, F = \begin{cases} rg\nabla g & \text{if } g \leq 0 \\ 0 & \text{if } g > 0 \end{cases},$$

respectively, where r is the contact stiffness. Choosing a penalty stiffness is the most criticized problem of the penalty method. For any fixed stiffness r, there exists a sufficiently large approach velocity such that the contact potential will be overcome by the momentum, allowing the configuration to tunnel 103 illegally through an inadmissible region 102 (FIG. 1).

The barrier method replaces the above contact potential by a function that grows unbounded as the configuration nears the boundary g(q)=0, eliminating the possibility of tunneling. However, such a function must also have unbounded second derivative, ruling out stable fixed-step time integration for any choice of step size.

To alleviate these concerns, embodiments of the invention utilize a construction consisting of an infinite family of nested potentials:

$$V_{\eta(l)}^{r(l)}, l = 1, 2, \ldots,$$

where $\eta(l)$ is a monotonically decreasing proximity (or "thickness") for the l-th potential, and r(l) is a monotonically increasing penalty stiffness. For these nested potentials to be a barrier, the cumulative energy of these potentials must diverge as the distance between two primitives vanishes:

$$\sum_l r(l)\eta(l)^2 \to \infty.$$

Here, $r(l)=r(1)l^3$ and $\eta(l)=\eta(1)l^{-1/4}$ are used, where r(1) and $\eta(1)$ are a simulation-dependent base stiffness and thickness for the outermost layer.

The region $\eta(n+1) \leq g(q) \leq \eta(n)$, where exactly n of the potentials are nonzero, is called the n-th discrete penalty layer (see FIG. 2). Thus, as the objects approach one another, the distance decreases and the energy increases. The nested potentials' respective maximal stable time steps form a decaying sequence. Therefore, this construction requires an adaptive or asynchronous time stepping procedure. Each interaction potential has its own integration clock, and has the opportunity to apply an impulse when its clock ticks. Embodiments of the invention time step such an infinite sequence by identifying a manageable set of clocks that are relevant (activated) in the simulation.

As alluded to herein, the above construction transforms a seemingly intractable problem in computational mechanics—establishing a multisymplectic treatment of contact mechanics with guaranteed absence of tunneling—into a challenging but addressable problem in computer science: efficient bookkeeping on a conceptually infinite set of interaction potentials.

During any time interval, while conceptually the (infinite number of) clocks continue to tick, and the totality of the clock ticks is dense in time, only a finite, sparse set of clock ticks apply (non-zero) impulses. In particular, the index of the discrete penalty layer indicates the number of active potentials; the rest, while conceptually present, do not influence the trajectory, and can be culled without approximation. What is needed is efficient bookkeeping to track which interaction potentials are active; each status change corresponds to a transition between penalty layers—a discrete change in state due to motion along a continuous trajectory. Embodiments of the invention solve this problem, for example, utilizing KDSs.

Kinetic Data Structures for AVIs

For the culling of inactive forces, embodiments of the invention use an implementation of kinetic separating slabs, as described further below. Herein FIGS. 3-5 may be referred to for illustrative examples of the kinetic separating slabs.

Figure 3:
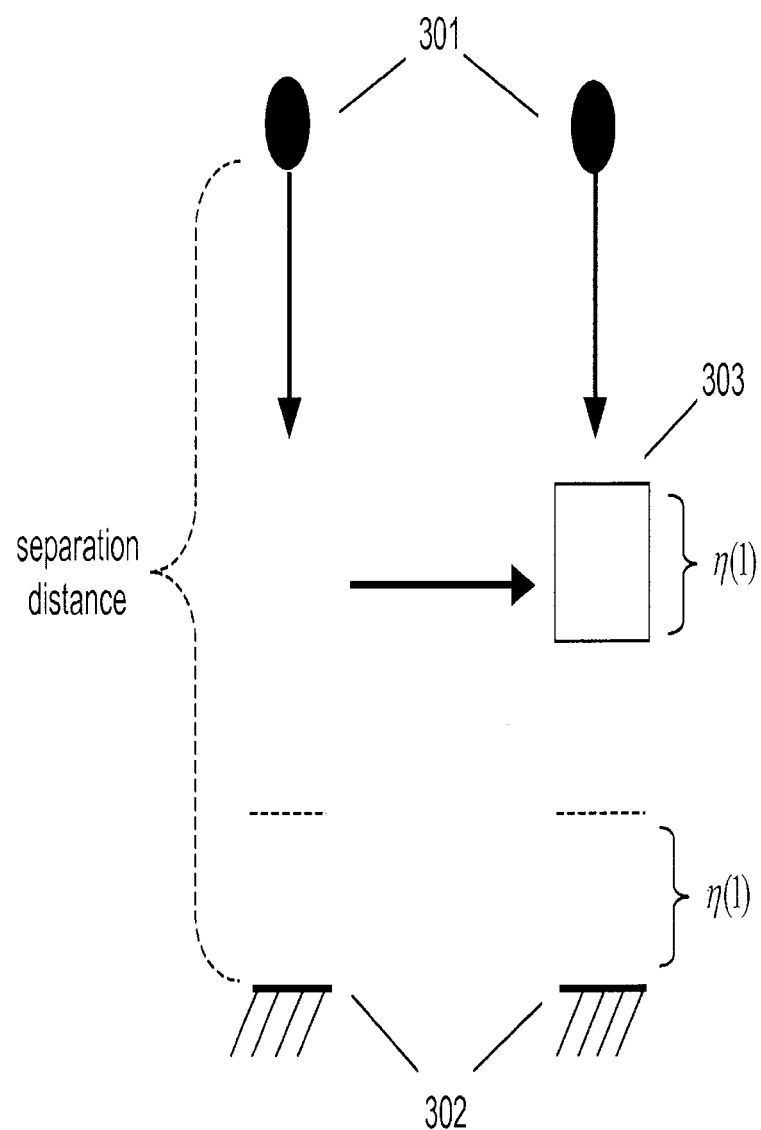
FIG. 3 illustrates certificate processing based on separation distance.

Referring to FIG. 3, as an illustrative example, consider a single particle 301 falling toward a fixed floor 302. Conceptually, the clock for the first penalty layer is always ticking; however, it is active (exerting a nonzero impulse) only when the particle 301 drops below height $\eta(1)$, say at time t. The clock must be activated, placing it on the priority queue for explicit consideration, no later than time t. Activating too late introduces error (misses impulses), while activating too early is correct, albeit overly conservative (some null events are not culled, which leads wasted computation).

Suppose that calculating t is expensive. A conservative optimization uses an $\eta(1)$-slab 303, a line extruded to thickness $\eta(1)$, separating the particle 301 from the floor 302. The separating $\eta(1)$-slab 303 serves as a proof, or certificate, that the particle 301 and floor 302 are at least $\eta(1)$ apart. This guarantee remains valid until either the floor 302 or the particle 301 enters the slab 303, at which point the certificate fails: an attempt to find a new slab can be made, or if doing so is costly or impossible, the first penalty force is activated.

Concretely, simulation begins with identifying an $\eta(1)$-slab 303; from the initial vertex state, and assuming a straight line trajectory, the time t when the particle 303 enters the slab 303 (LINE 12) is computed, and this certificate failure event is scheduled on the priority queue (LINE 13). If t is hard to compute, any earlier time $t_1^{cf} < t$ is correct but conservative.

Figure 4:
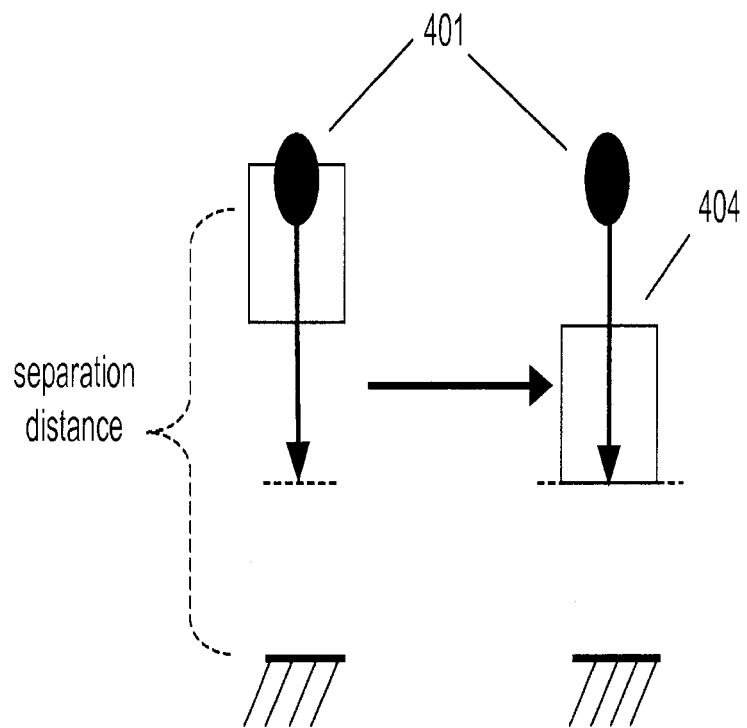
FIG. 4 illustrates certificate processing based on separation distance.

Referring to FIG. 4, At time $t_1^{cf}$, the failure event pops off of the queue (LINE 2). The separation distance is checked. Suppose it exceeds $\eta(1)$. A new $\eta(1)$-slab 404 is identified (LINE 16), and a new failure event is scheduled, say at time $t_2^{cf}$ (see FIG. 4).

Referring to FIG. 4, suppose that the next event, at time $t^g < t_2^{cf}$, corresponds to integration of gravity. The particle's 401 position is integrated based on the particle's 401 last-known state and the elapsed time (LINE 5); the particle's 401 velocity is integrated based on the gravitational force (LINE 9). Failure time $t_2^{cf}$ was computed assuming a constant velocity, an assumption now broken; $t_2^{cf}$ might no longer be conservative, so the failure event must be rescheduled to guarantee safety (LINES 11-14) (FIG. 4).

Figure 5:
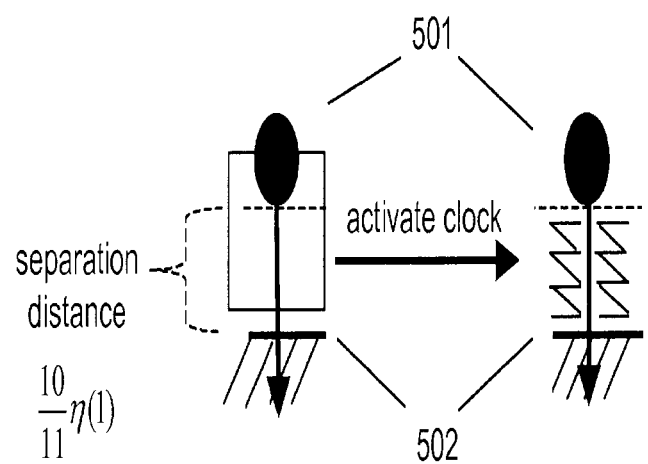
FIG. 5 illustrates certificate processing based on separation distance.

The simulation continues in this manner. Referring to FIG. 5, as the particle 501 approaches the floor 502, the benefits of culling clock ticks of penalty layer one are eventually outweighed by the increasing frequency $\eta(1)$-slab events. In an exemplary implementation, a trade-off point is determined to occur when the separation distance is below $$\frac{10}{11}\eta(1);$$

the decision of how to flag this trade-off affects performance but not safety or correctness, and thus can be modulated.

When the use of $\eta(1)$-slab is no longer considered profitable, the layer-one penalty clock is activated (LINE 17) and in favor of using $\eta(1)$-slabs (see FIG. 5). Clock ticks are culled only for deeper layers. Inactivity can be certified by identifying an $\eta(2)$-slab, computing and processing failure, reconstruction, and rescheduling (as described above).

With the layer-one clock active, a layer-one penalty force integration event is soon encountered. This event is treated in the same manner as the gravity event or any force event.

Furthermore, this event serves as an opportunity to check whether the particle is transitioning to a shallower penalty layer: if (a) the penalty impulse is null, that is, separation distance exceeds $\eta(1)$, and (b) the relative velocity is separating rather than approaching, then the penalty force is deactivated, transitioning to the next-shallower layer and adjusting the certificates accordingly. This relaxed approach to deactivation is safe by clause (a) alone; clause (b) aids in efficiency, avoiding rapid toggling of penalty layers.

Figure 6:
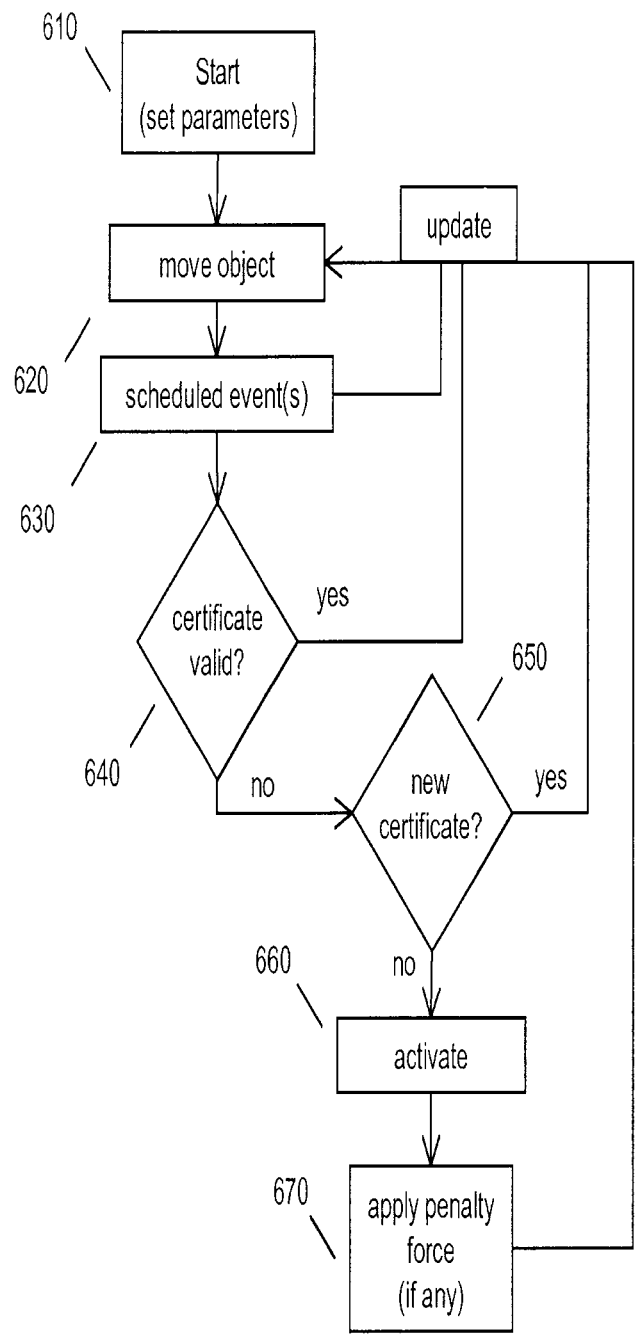
FIG. 6 illustrates an exemplary method for simulating motion of an object using certificates.

Turning to FIG. 6, an exemplary flow of object (particle) motion data processing is illustrated. As shown, the object is moved in the simulation, with the object's movement being according to some predefined constant forces at the start. At 602 it is determined if the certificate for the object is valid at some predetermined instant in time, which should be an integer multiple of the clocks. If the certificate is still valid, the clocks can be culled and the object continues to move through the simulation, as they would be applying a zero force and thus not changing the simulated trajectory. However, if it is determined that the certificate is not valid 602, it is determined if a new certificate is available at 603. If a new certificate is available, it is created and the object continues to move. As discussed herein, even if a new certificate is available, it may not be efficient to calculate and the process may step to 604. Similarly, if a new certificate is not available, at 604 the clock (of the outermost penalty layer) is activated and the force can be applied as appropriate. Again, the force applied may be zero if the clock has been started early (for example if the new certificate, though available, has been forgone in lieu of activation). Thus, the object's motion can be updated (via updating the data structures) in the simulation according to the applied force. The process iterates to appropriately apply varying forces throughout the object's simulated motion, such as necessary to simulate a contact with another object.

Stencils, Supports, and Scheduling Dependencies

With a basic depiction of a KDS in place, the description now proceeds to efficiency and optimization, after laying out the requisite terminology. Consider the execution of an event at its scheduled time. The set of vertices whose velocities are altered is the stencil of the event. The set of vertices whose trajectory was used to schedule this time is the support of that event. Building on the notions of stencil and support, an event depends, or is contingent, on another if the support of the former overlaps the stencil of the latter; vice versa, an event supports another if the stencil of the former overlaps the support of the latter. Table 1 shows the support and stencils for a set of typical events.

TABLE 1

Events and Associated Supports and Stencils

| Event | Supporting vertices | Stencil vertices |
|---|---|---|
| Gravity | | Entire mesh |
| Stretching force | | Triangle |
| Bending force | | Hinge |
| Penalty force | | Pair of primitives |
| Separation slab | Pair of primitives | |
| k-DOP overlap | Those in k-DOP | |
| Render frame | | |

KDSs in prior approaches were applied only to synchronous simulations, where the velocities of all primitives are updated at the same instant. That is, the stencil of the force-integration event contains the set of all vertices. By contrast, in an AVI simulation such as utilized by embodiments of the invention, force-integration events typically bear small stencils.

Having executed a supporting event, all dependent events are rescheduled before proceeding (LINES 11-14). This is a problem of executing partially ordered instructions with dependencies, and it is thoroughly studied in the computer systems literature (and therefore not addressed in detail herein).

Figure 7:
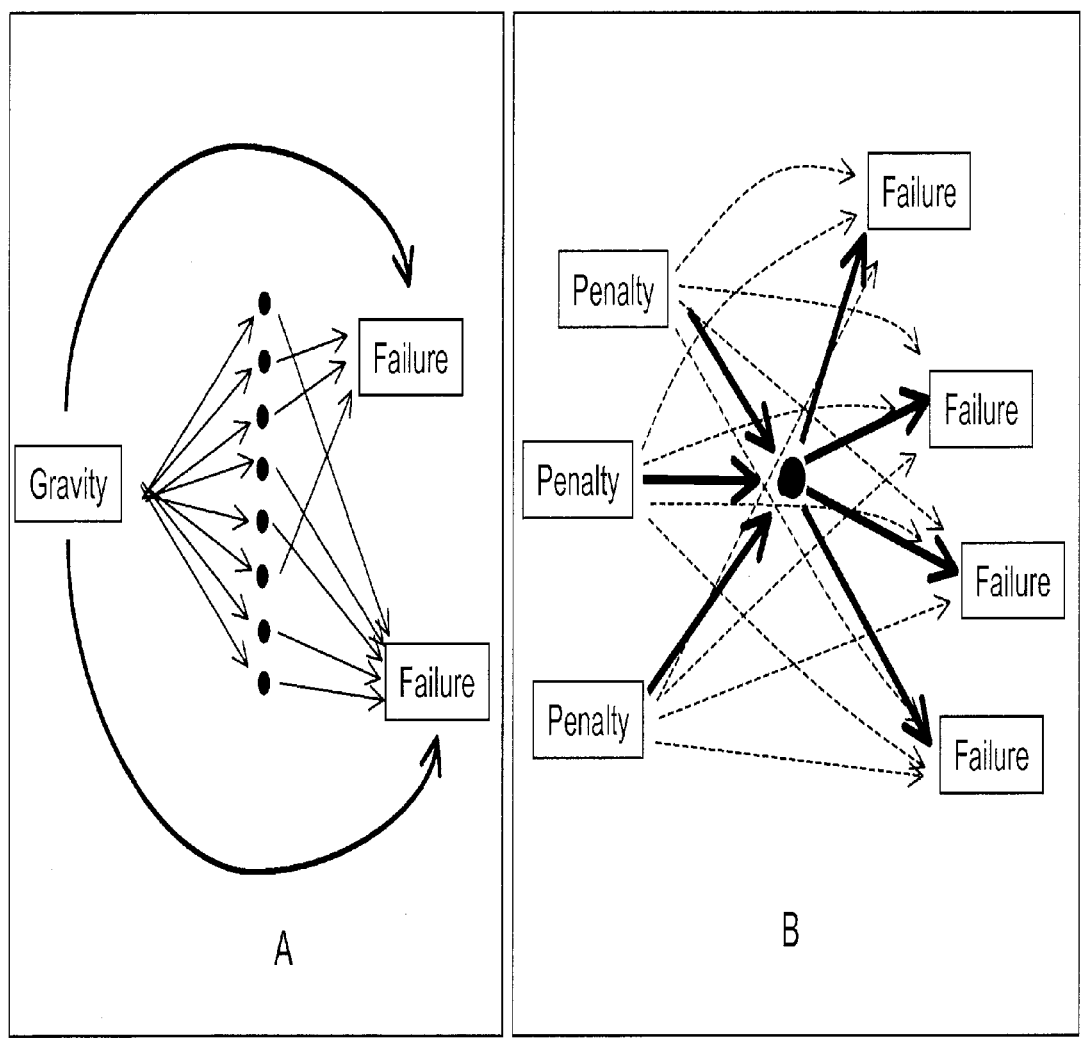
FIG. 7(A-B) illustrates directed graphs.

Referring to FIG. 7A-B, an exemplary embodiment of the invention maintains a directed graph, where edges from events to vertices and vice versa denote stencil and support relations, respectively (FIG. 7A-B). When an event executes, the two-neighborhood of outgoing edges yields the set of events to reschedule. The graph abstraction reveals that events with large stencils, such as gravity, should cache a list of contingent events, while events with small stencils should construct the list of contingent events on-the-fly; refer to FIGS. 7 A and B, respectively.

Thinning Out Certificate Rescheduling

Every velocity update requires the rescheduling of dependent events. This rescheduling tends to be too costly and so frequent that it becomes intractable; these drawbacks are recognized in the KDS literature. Accordingly, embodiments of the invention utilize vague trajectories to safely reduce the frequency of rescheduling.

Certificates are rescheduled when a supporting trajectory is altered. Because KDSs are utilized by embodiments of the invention specifically in the context of contact mechanics, physical insights can be brought into play that would otherwise not be available.

Figure 8:
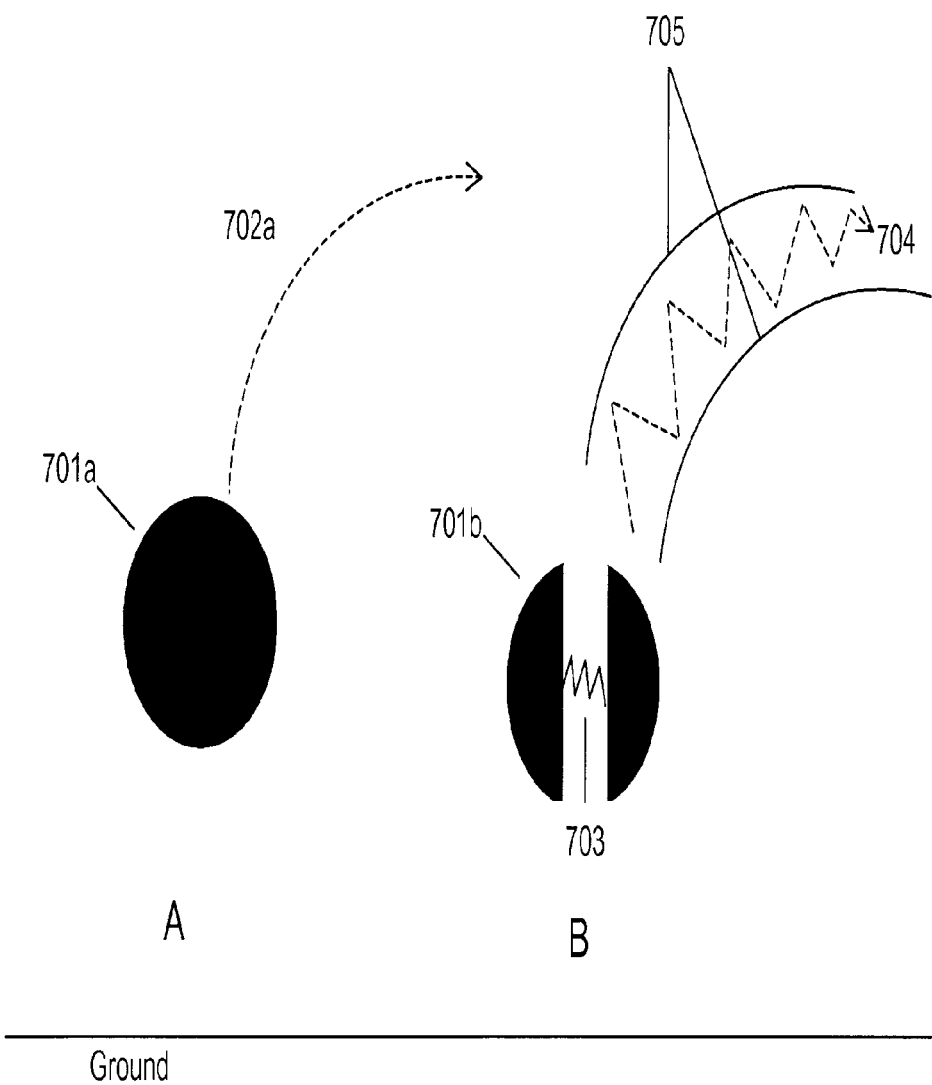
FIG. 8(A-B) illustrates object motion and a trajectory tube.

Referring to FIG. 8A-B, as an illustrative example, consider an object 701 such as an apple, which after being tossed into the air follows a parabolic trajectory 702a before hitting the ground. If the apple is split in two 701b and the two halves are connected with a stiff spring 703, when the apple 701b is tossed once more, since the two halves quickly oscillate against each other, the trajectory 704 of each half has many wiggles, that is, changes in velocity. Even so, the trajectory of the center of mass is exactly parabolic and, ignoring the high-frequency wiggles, the trajectory of each half is "overall" parabolic. Most importantly, unless the half-apple is very close to the floor, the parabola serves as an excellent predictor of the collision time with the floor, while the velocity associated to the rapid oscillations is noisy. This noise is twice detrimental: it impoverishes the collision time estimate, and, worse, it causes frequent rescheduling.

To harness this insight, embodiments of the invention consider trajectories with bounded uncertainty. In place of precise linear trajectories, embodiments of the invention consider "tubes" 705 wide enough to encompass the noisy oscillations. On the one hand, this requires computation of certificate expiration times that are conservative in the sense that they are valid for any precise trajectory that fits in the tube 705. On the other hand, the certificate will remain valid despite noisy changes to the future trajectory, or flight plan, so long as the current trajectory remains inside the tube 705. If the predicted tube 705 is not too thick, and if the actual trajectory remains inside the predicted tube 705 for sufficient time, a (safe, correct) dramatic reduction in rescheduling is possible.

A simple and exemplary implementation motivated by this idea is now presented. Recall the scheduling approach for the simple separating slab KDS. After creating a new certificate (say at time $t=t_0$), a certificate failure time can be scheduled by solving for the time at which the particle enters the slab, assuming a constant velocity. Because of this restrictive assumption, even a small impulse necessitated event rescheduling.

To introduce vagueness, the assumption is weakened to allow for a time-varying velocity. Therefore, the velocity of the particle $\dot{x}(t)=\dot{x}(t_0)+u(t)$, where $u(t)$ is a time-varying vector of bounded length $\|u(t)\|\le\epsilon$. The relaxed assumption has two implications. First, it is now possible for many impulse events to affect the particle without necessitating a certificate rescheduling, so long as each impulse keeps $\|\dot{x}(t)-\dot{x}(t_0)\|\le\epsilon$. Indeed, for $\epsilon<\|\dot{x}(t_0)\|$, there is a cone of trajectories that avoid rescheduling. Second, the computation of the failure time must be conservative over all future trajectories satisfying the relaxed assumption. That is, the earliest possible failure time must be computed. For the separating slab, the trajectory producing the earliest "worst case" failure is the one maintaining $\|u(t)\|=\epsilon$ with $u(t)$ in the direction of the slab.

Increasing $\epsilon$ reduces rescheduling frequency, since it widens the cone (tube) of covered trajectories; unfortunately, it also increases the frequency of certificate failures, since the worst-case trajectory reaches the slab sooner; these two considerations must be balanced. Fortunately, any choice of $\epsilon$ keeps the system safe—the choice of $\epsilon$ cannot alter the actual simulated trajectory.

Broad Phase

An exemplary implementation begins with the simple separating slab KDS described above, modified so that slabs have constant (rather than zero) normal velocity. This is considered the "narrow phase."

While formally correct, the simple KDS used on its own will not scale efficiently to large scenes. Various sophisticated KDSs track proximity, offer better "broad-phase" scaling, and could be easily adapted to the bookkeeping of the discrete penalty layer (DPL) index. For simplicity, the description herein is limited to those concepts particular to the synthesis of AVIs with KDSs, independent of the chosen KDS. For completeness, an exemplary implementation of a broad-phase KDS is briefly described, then cross-cutting concepts are discussed.

Kinetic k-DOP Hierarchy

A k-discrete oriented polytope (k-DOP) is a bounding volume (BV) described by k/2 real intervals $S_i=[\alpha_i,\beta_i]$, $1\le i\le k/2$, each describing an object's extent (or "support") along some predetermined supporting axis $d_i$. For k=6 and orthogonal axes, k-DOPs reduce to axis-aligned bounding boxes (AABBs). For $k\to\infty$, k-DOPs approximate convex hulls.

Like most BVs, k-DOPs work best in a hierarchy whose leaves bound primitives and progressively coarser levels bound aggregates. In synchronous simulations, a collision step updates ("rebuilds") and traverses ("broad phase detection") the entire hierarchy; the cost is amortized over the consideration of all pairwise collisions in the scene. This economy of scale does not immediately carry over to AVIs, where each integration step updates only a handful of primitives.

The KDS amortizes not over space but over time: as the position of primitives continuously evolve, discrete transitions are identified in execution flow of the broad-phase traversal algorithm. Such a kinetization of the hierarchy traversal is described in detail in other works in the context of AABBs and synchronous simulations, but the general idea of incrementally updating a collision-detection tree traversal is known well beyond the KDS literature. In retrospect, the approach seems to fit most naturally as a component of an asynchronous simulation, yet prior work does not harness the natural affinity of KDSs and AVIs.

For additional details, one can consult earlier works. Here, only the k-DOP and AVI-specific concepts are described that were not explored in prior works and are relevant to exemplary embodiments of the invention described herein.

Since a hierarchical BV algorithm decides whether to recurse by testing the overlap of two k-DOPs, the associated kinetic proof uses overlap and non-overlap certificates; the failure times thus correspond to instants at which two k-DOPs become (non-)overlapping.

Consider a certificate guaranteeing non-overlap of k-DOPs a and b. The simplest proof identifies a single axis $d_i$ with disjoint extents. This proof is valid during time intervals where $S_i^a \cap S_i^b = \emptyset$, that is $\alpha_i^b - \beta_i^a > 0$ or $\alpha_i^a = \beta_i^b > 0$. Following the didactic example given above, assume that the vertex trajectories are linear in time. Since a k-DOP contains multiple vertices of differing positions and velocities, the upper extent $\beta_i^a(t)$ is convex piecewise linear in time, where kinks correspond to a new "leader" overtaking the extremal vertex (see FIG. 9); likewise, $\alpha_i^a(t)$, $\alpha_i^b(t)$, $\beta_i^b(t)$ are convex p.l. Therefore, computing the failure time reduces to finding the first instant at which a p.l. function becomes negative.

A more ambitious certificate uses the k-DOP's multiple axes, and the observation that the failure of one axis need not bring down the whole certificate. Each axis $d_i$ yields a set of time intervals where the a and b are separated; the certificate is valid over the union of all positive intervals associated to all k/2 axes, that is, it fails at the instant where all k/2 axes have negative p.l. functions.

Fast Certificate Scheduling

A potential downside of KDSs is the frequency and cost of rescheduling. Embodiments of the invention utilize methods to reduce rescheduling frequency using vague trajectories (as described herein). Moreover, embodiments of the invention utilize methods for reducing rescheduling cost.

Solving for a certificate failure time requires fast root finding techniques. Even when vertex trajectories are linear in time, the algebraic function represented by the certificate can have non-trivial algebraic complexity. Embodiments of the invention avoid these numerical issues by using only certificates whose failure times are roots of a univariate p.l. polynomial, requiring identification of the ("piecewise") segment followed by a subtraction and a division for the ("linear") solve.

Figure 9:
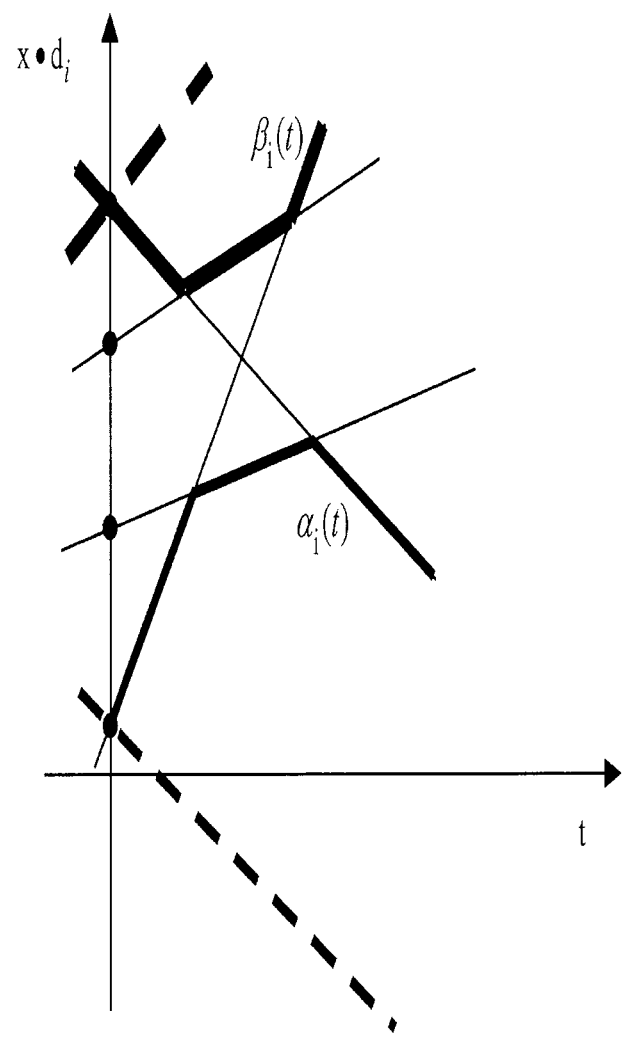
FIG. 9 illustrates certificate guaranteeing according to an embodiment.

The effort of computing a certificate failure time goes in vain when a supporting event executes in the interlude. The more distant the failure time, the more likely the wasted effort. The general answer is to quickly compute a safe approximate time guaranteed not to exceed the actual certificate failure time. The associated reconfirmation event no longer implies a certificate failure; instead it reconfirms the current proof by attempting to find a future reconfirmation time. When a reconfirmation event fails to find a safe future time, embodiments of the invention can either schedule a true failure time, or treat the failed reconfirmation as a (premature) certificate failure. Either approach is safe, but the latter fully eliminates the typically more complex implementation of precise failure time computation. Discussed herein are two exemplary conservative approximations implemented:

Linear envelope on k-DOP extent: A p.l. function $f(t)$ over $t \geq 0$ can be bounded from above by a linear function $\hat{f}(t) = f(0) + mt$, with slope m the maximum over the slopes of the pieces of $f$ (FIG. 9); a bound from below follows similarly. Referring to FIG. 9, one axis of a k-DOP bounding 4 vertices over time is illustrated. The bounds $\alpha_i(t)$ and $\beta_i(t)$ are linear functions. The dashed lines show the linear envelope that is a conservative bound for all t>0. An embodiment of the invention uses this fact to find conservative (non-)overlap times for k-DOP extents.

Adaptively short-circuit to the most useful k-DOP axes: Not all k-DOP axes are created equal. Depending on the configuration, some excel while others fail in establishing separation. Processing only the useful axes, taking the intersection of their bounds, and thus reducing by a constant factor the O(nd) computation of extremal velocities and positions is achieved in two steps. First, it is assumed that the k axes are already (nearly) sorted from most to least-useful, and embodiments of the invention progressively improve the bound by incorporating an additional axis, until an axis fails to improve the bound. In the second step, the sorting (for next time) is improved by attempting to incorporate one random unused axis, and promoting this axis to the front of the list if it did improve the bound. For surface meshes, where k-DOPs have high aspect ratios described by a couple of axes, this approach is very effective. This idea can be understood in the language of coresets (discussed at length in prior work); the coreset constituency is dynamically updated as the system evolves.

Dissipative Forces

In using a geometric integrator, embodiments of the invention exhibit energy near-conservation for long run times. Controlled dissipation, in the form of friction, impact coefficient of restitution, or viscous damping of high-frequency modes, is often desired in practical simulations. The emphasis here is not on advanced models of dissipation, rather on basic ideas for incorporating controlled dissipation into the framework outlined herein without compromising safety, correctness, and progress.

The limiting behavior as two events are brought to coincide should be continuous, that is, unique and independent of how this limit is approached. Simultaneous events must yield an order-independent outcome. If a perturbation to the problem setup (for example, time step size, initial vertex position) or a numerical error perturbs the order of nearly contemporaneous events, reordering continuity keeps the trajectory predictable.

Sufficient condition. If forces depend on positions, past and present, but not on momenta, then the trajectory is independent of the processing order of simultaneous events. Proof: an event outcome affects only future positions; a computation based on past and present positions is unaffected by outcomes of simultaneous events.

Conservative forces trivially satisfy this condition. However, since the most straightforward implementation of dissipation computes momenta-dependent quantities, it fails to meet the sufficient conditions, and generally leads to order-dependent outcomes.

Fortunately, a simple solution is at hand. Where a force formulation calls for momentum, embodiments of the invention use the Verlet identity $p^{k-1} = M(q_k - q_{k-1})/h$, a finite difference of past and present positions. To ensure a well-behaved, regular temporal discretization, only the positions associated to the dissipative force's clock are considered. This corresponds to the average momentum in the interval between dissipative events, which, because of the interruptions induced by other asynchronous clocks, will generally not correspond to the momentum immediately preceding the dissipative event.

Figure 10:
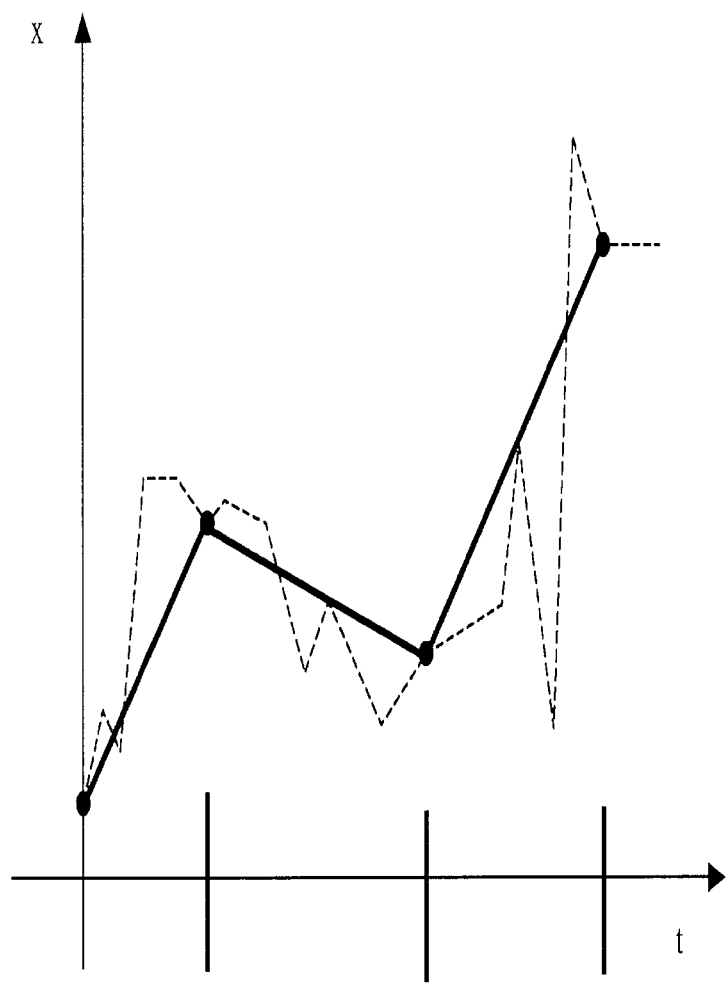
FIG. 10 illustrates dissipative force computation.

All of this is illustrated in the FIG. 10, where the solid line trajectory shows what is being used for the computation of the dissipative force, while the dashed line trajectory includes updates from all events. Embodiments of the invention invoke this concept in discretizing several dissipative forces.

Viscous Damping

Consider an elastic spring connecting two vertices i and j. Viscous damping acts to slow the rate at which the spring changes length. A new clock is created (one could also ride on the elastic clock, stability permitting) and compute a viscous force:

$$F_{k,i} = b(l_k - l_{k-1})e_k/l_k = -F_{k,j}, e_k = q_{k,j} - q_{k,i}, l_k = \|e_k\|,$$

where b is the damping coefficient, $q_{k,i}$ is the position of the i-th vertex, and the vector $e_k$ and length $l_k$ are local; a subscript (i,j) is implied. Embodiments of the invention cache $l_{k-1}$ so that its value can be used at time $t_k$.

In the case of a single spring, the approach reduces to explicit Verlet integration of the viscous force, with its attendant time step restriction. Prior work has advocated a semi-implicit integration of the viscous force. Such an approach might also be adopted in place of the one presented above, trading order independent processing of simultaneous events for larger viscous force time steps.

Many simulations incorporate some viscous internal (stretching and bending) damping. Curtains, for example, illustrate the benefit of starting from a conservative foundation. Using only internal damping, high-frequency vibrations introduced by the prescribed particle are quickly damped out, while the curtains' graceful swinging continues; using a non-geometric integrator such as backward Euler or BDF2, the swinging motion would also be damped.

Coefficient of Restitution

The coefficient of restitution $e_{COR}$ is a "melting pot" approximation, accounting for various unresolved micro-level phenomena including viscosity and plasticity. To model plastic work, embodiments of the invention replace the nested penalty potentials with biphasic potentials:

$$V_\eta^r(g(q)) = \begin{cases} \frac{1}{2}rcg(q)^2 & g \leq 0 \\ 0 & g \geq 0 \end{cases}$$

where c is $e_{COR}$ if the primitives are separating, 1 otherwise. The penalty layers exert their full force during compression, then weaken according to the coefficient of restitution during decompression. This model can be further extended to account for viscous damping during impact, measuring strain rate by (some monotonic function of) the change in the gap function g(q).

While simple, the above-outlined approach has a drawback in the inelastic limit $e_{COR}=0$: the penalty impulses can leave as residue a small separating relative velocity. The magnitude of this velocity is at most $r(l)\eta(l)h$, where h is the layer's time step, so it can be limited by choosing a small enough r(l) or h.

Figure 11:
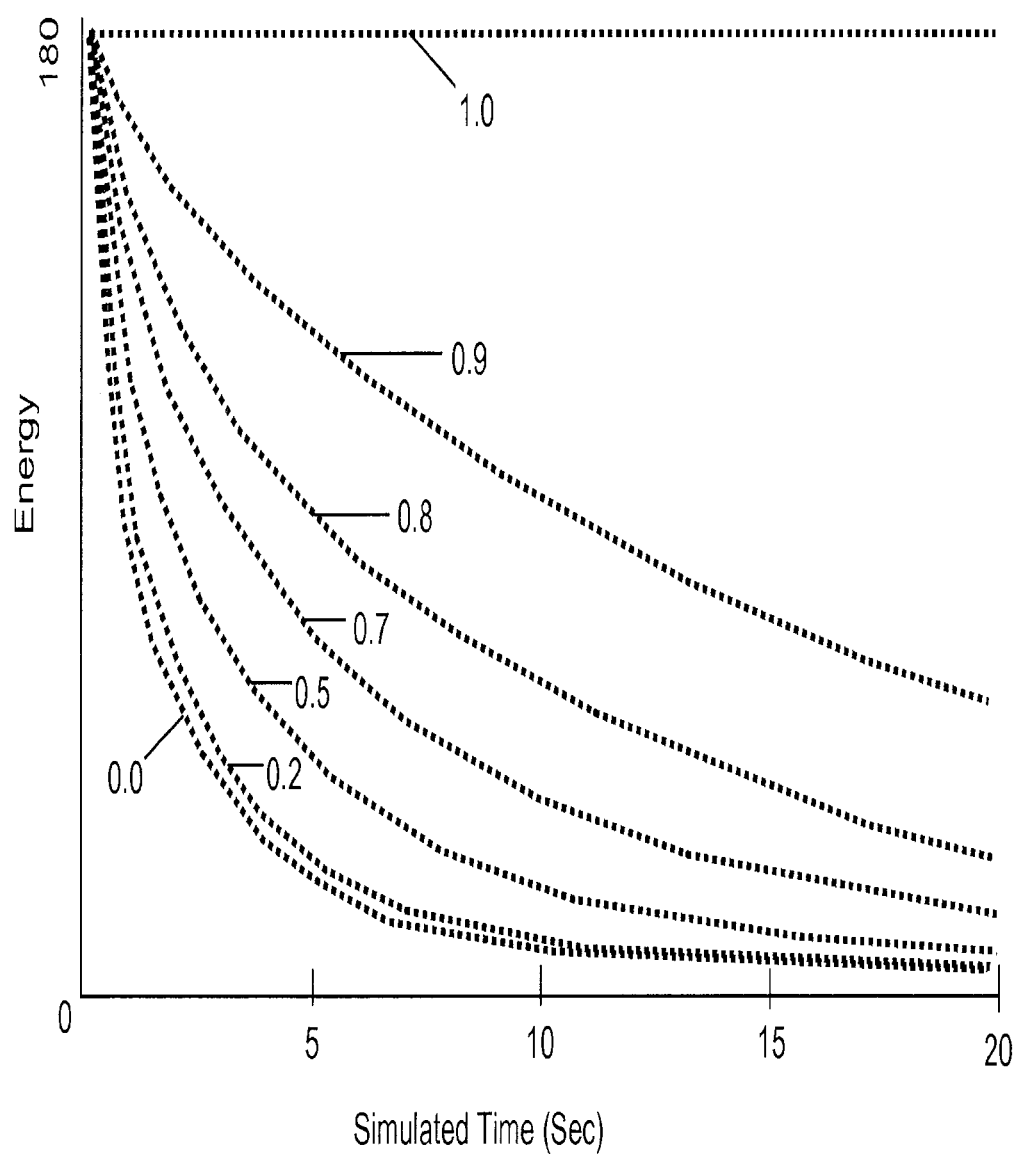
FIG. 11 illustrates the energy of the system as a function of time for multiple values of $e_{COR}$.

The long-term good energy behavior accompanying use of a symplectic-momentum integrator translates into predictable, controllable energy dissipation when a non-unit coefficient of restitution is used in a simulation. To test the energy behavior for a variety of coefficients of restitution, a box of 900 particles with random initial velocities was simulated. FIG. 11 shows the energy of the system as a function of time for multiple values of $e_{COR}$. As illustrated, in all cases energy decays smoothly and predictably.

Friction

The Coulomb friction model serves as a simple approximation of an extremely complicated physical interaction. Consider the Coulomb friction force $F_f = \mu F_n$, where $\mu$ is the coefficient of friction and $F_n$ is the normal force. The force opposes relative tangential motion between points in contact.

Embodiments of the invention apply friction along with each penalty force, separately for each penalty layer. Just as increasingly stiff penalty forces are applied for contact forces, friction forces are increasingly applied (bounded by each $F_n$) to correctly halt high-speed tangential motion.

Impulse-based collision response methods cap the magnitude of the Coulomb friction force, so that a large normal impulse does not cause relative tangential motion to reverse direction. Embodiments of the invention do not cap, because a capping strategy that is compatible with order-independence of simultaneous events has yet to be identified. For a pair of primitives in contact, friction is applied piecemeal, at the ticks of the penalty layer clocks, instead of as a single impulse. This serves as a reasonable discretization of kinetic friction, but it is essentially an approximation of static friction. In particular, it is possible for a friction update to reverse relative tangential motion; the magnitude of this reverse motion is bounded by $\mu r(l)\eta(l)h$, so it can be limited by choosing sufficiently small stiffness function r or time step h. Structures whose stability depends on static friction may benefit from a more complete treatment of friction.

Generalization: Inextensibility Constraint

As alluded to above, nested penalty layers can enforce a broader class of unilateral constraints. Consider edge inextensibility constraints in 2D. For two vertices i and j delimiting an edge of rest length l, this edge is constrained to not compress or extend by $\pm sl$, for some $s \ll 1$. Two nested sequences of penalty layers are introduced, their gap functions replaced by constraint functions:

$$g_i(q) = (1+s)l - \|x_j - x_i\|$$

$$g_j(q) = \|x_j - x_i\| - (1-s)l.$$

The penalty layers associated with $g_i$ and $g_j$ prevent excess stretch and compression, respectively.

A cloth curtain hit by a fast-moving projectile was simulated to compare implementations based on constraints and elastic springs. For any chosen spring stiffness, a sufficiently energetic projectile stretches the curtain by arbitrary amounts, resulting in a "rubbery" curtain. On the other hand, enforcing inextensibility using nested penalty layers avoids stretching no matter the projectile's velocity. Implementation of the inextensibility constraint for 3D triangle meshes would require a constraint formulation that does not lock bending modes, such as that proposed in previous work.

Embodiments of the invention have been used in simple experiments and to gather empirical measurements supporting the guaranteed safety and good energy behavior of the proposed contact simulation, for both conservative and dissipative contact. Challenging problems involving complex contact geometries, sharp features, and sliding during extremely tight contact have also been successfully simulated utilizing embodiments of the invention. A few exemplary simulations are described briefly below.

Knots: Tying of ribbons into reef and bowline knots have been successfully simulated using embodiments of the invention. The ribbons are modeled as a loose knot assigned a material with stiff stretching and weak bending, the ends pulled by a prescribed force. The bowline knot also requires the prescription of fixed vertices behind the cylinder where a finger normally holds the material in place. The final configuration is faithful to the shape of actual "Boy Scout manual" knots.

This example demonstrates the strength of asynchrony in allocating resources to loci of tight contact. As the knot tightens, progressively finer time steps are used for the tightest areas of contact. If instead of prescribing reasonable forces an outward motion of the two ends of the ribbon was directly prescribed, the simulations execute to the point where the mesh resolution becomes the limiting reagent. That is, a tighter knot cannot be tied without splitting triangles; past this point, the computation slows as penalty interactions burrow to deeper layers and the mean time step decays.

Trash compactor: Triangle meshes of varying complexity were placed into a virtual trash compactor consisting of a floor and four walls, and then prescribe the inward motion of opposing walls. Embodiments of the invention are able to simulate the approach of the walls without ever allowing for seen or unseen penetrations. As with the knots, the overall rate of progress decays as the simulation approaches a limiting configuration.

Bed of nails: To test the handling of isolated point contacts and sharp boundaries, a test problem was crafted. Four sliver triangles are assembled into a nail, and many such nails are placed point-up on a flat bed. Two stacked fabrics were draped over the bed of nails, and it was observe that the simulated trajectory is both realistic and free of penetrations, oscillations, or any other artifacts typically associated to contact discontinuities. Next, the motion of one end of the fabric was prescribed, tugging on the draped configuration to demonstrate sliding over sharp features.

The bed of nails was extended into a landing pad for various coarsely meshed projectiles. Variably-sized to barely fit or not fit between the nails, and thrown with different initial velocities and angles, the projectiles exhibited a wide array of behaviors, including bouncing, rolling, simple stacking, ricocheting at high frequencies (this requires resolving each collision when it occurs, as resolving collisions over a fixed collision step size can cause aliasing that prevents the ricochet); sliding and getting stuck between nails (the sliding requires a deformable model and friction, since a perfectly rigid object would be constrained to a sudden stop by the distance.

Timing: Computation time for the various examples, as executed on a single thread of a 3.06 Ghz Intel Xeon® with 4 GB RAM, are listed in Table 2 as non-limiting examples. The bulk is allocated to the maintenance of the kinetic data structures used for collision detection. The effect of introducing vague trajectories for the reef knot and compactor was measured, and observed at approximately 30% improvement in overall performance. Intel and Xeon are trademarks of Intel Corporation in the U.S. and other countries.

TABLE 2

Exemplary Computation Times

| Example | Vertices | Simulation (Seconds) | Event Processing (Hours) | KDS Event Rescheduling (Hours) | Total (Hours) |
|---|---|---|---|---|---|
| Reef Knot | 10642 | 2.00 | 1.5 | 16.7 | 18.5 |
| Bowline Knot | 3995 | 5.00 | 3.0 | 141.1 | 144.5 |
| Trash Compactor | 714 | 3.08 | 0.5 | 53.0 | 53.6 |
| Two Sheets Draped | 15982 | 3.95 | 4.5 | 260.8 | 265.8 |
| Two Sheets Pulled | 15982 | 3.83 | 13.6 | 310.5 | 325.6 |

As a more detailed study, consider that the reef knot simulation required 4.8% of total simulation time for integration of elastic forces and gravity, 0.09% for integration of penalty forces, 0.9% for processing and 1.0% for rescheduling of separating plane events, respectively, 5.2% and 23.0% for processing and rescheduling of separation list events, respectively. All other time was spent performing vague trajectory checks and queue maintenance. The incident figure demonstrates how per frame runtime increases as the stress on the ribbons elevates.

Parameters: Listed in Table 3 are exemplary parameters for the various examples. Bending and stretching stiffness refers to the Discrete Shells and common edge spring models.

TABLE 3

Exemplary Parameters

| Example | Density | COR | r (1) | η (1) | Stretching Stiffness | Stretching Damping | Bending Stiffness |
|---|---|---|---|---|---|---|---|
| Reef Knot | 0.1 | 0.0 | 1000.0 | 0.1 | 750.0 | 0.1 | 0.01 |
| Bowline Knot | 0.01 | 0.0 | 1000.0 | 0.1 | 100.0 | 0.1 | 0.01 |
| Bunny Compactor | 0.01 | 0.01 | 10000.0 | 0.05 | 1000.0 | 0.0 | 1000.0 |
| Trash Compactor | 0.001 | 0.01 | 1000.0 | 0.05 | 1000.0 | 15.0 | 10.0 |
| Two Sheets Draped | 0.001 | 0.0 | 1000.0 | 0.1 | 1000.0 | 1.0 | 0.1 |
| Reef Knot Untied | 0.1 | 0.0 | 1000.0 | 0.1 | 1000.0 | 0.1 | 0.01 |
| Two Sheets Pulled | 0.001 | 0.0 | 1000.0 | 0.1 | 1000.0 | 1.0 | 0.1 |
| Balls on Nails | 0.016 | 0.3 | 10000.0 | 0.1 | 50000.0 | 1.0 | 100000.0 |
| 2D Sludge | — | 0.0 | 1000.0 | 0.1 | — | — | — |

One of the driving goals for embodiments of the invention is to provide simulation methods that ensure safety, correctness, and progress regardless of the choice of parameters. The methods proposed herein do expose some parameters to the user, such as the proximity η and the trajectory vagueness ε. These parameters affect performance, not the triad of guarantees. Experience in running the problem scenarios, therefore, were qualitatively different than when using other methods, in that a search for parameters to ensure a successful modeling of contact was not needed.

Although in theory the nested penalty barrier has infinitely many penalty layers at its disposal, it is impractical to activate penalty layers whose stable time steps are too small, for example, below the floating point epsilon. Simulations with thicknesses η(1) too small, or velocities or masses too high, can thus fail to make progress (but remain safe). This limitation can be worked around by choosing a slow-shrinking layer distribution function, one possible recommendation is $\eta(1) = \eta(1) l^{-1/4}$.

Multistepping methods such as AVIs are known to have resonance instabilities, particularly if the simulation contains adjacent mesh elements of very different size. However, no such instabilities or artifacts have been observed in use of embodiments of the invention.

Those having ordinary skill in the art will readily understand that embodiments of the invention may be implemented using one or more computer systems. In this regard, a non-limiting and exemplary computer system is described herein.

Figure 12:
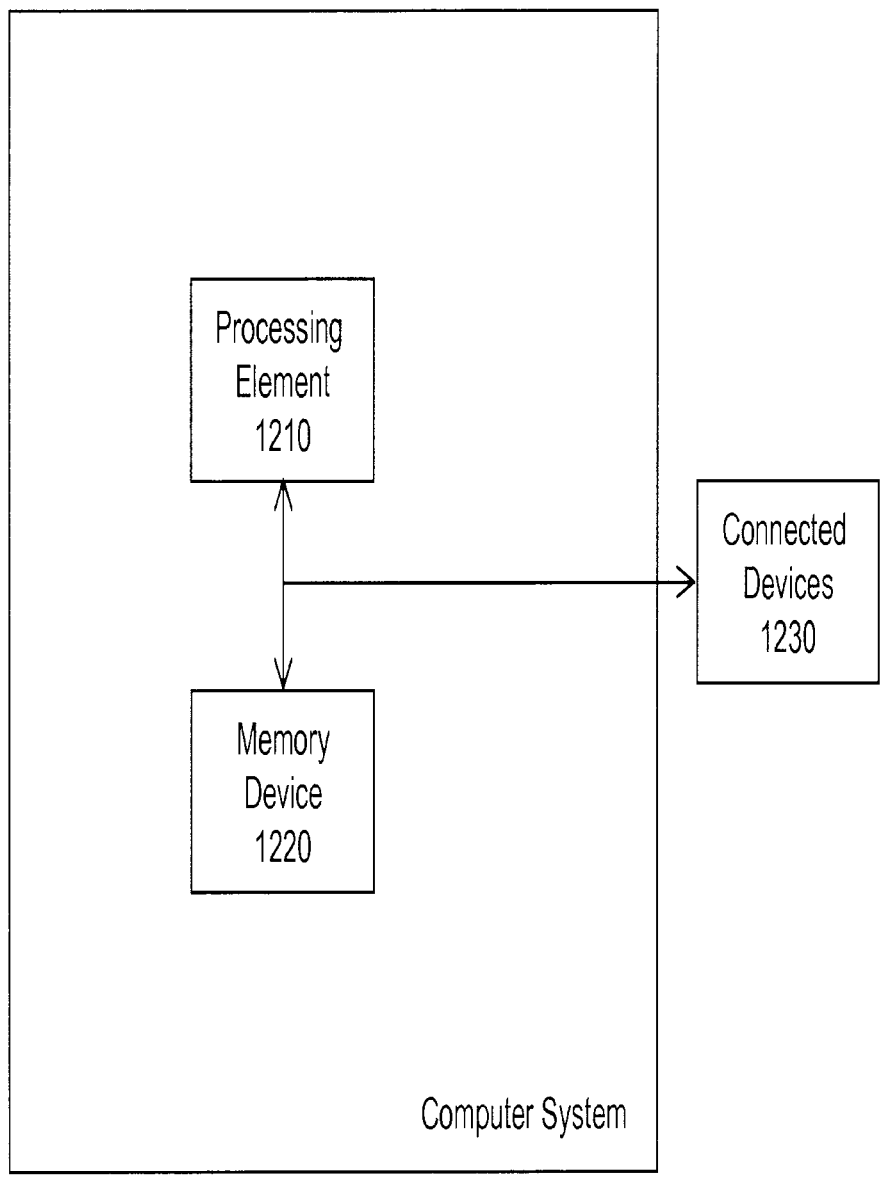
FIG. 12 illustrates an exemplary computer system.

As shown in FIG. 12, aspects of the invention may be carried out in a computer system, such as user workstations, personal computers, or other client devices. In FIG. 12, an exemplary computer system can include a processing element 1210, such as a processor, controller or the like, and an associated memory device 1220, both of which are commonly included in computer systems. Moreover, it will be understood that the computer system may be connected to various connected devices 1230, such as display devices for viewing object simulations, other computer systems, and the like.

In this regard, various aspects of the invention described can be performed by the processing element 1210 executing computer program instructions (including computer program code) stored by and accessible from, for example, the memory device 1220. Thus, it will be understood that certain operations described herein can be implemented by executing computer program instructions that are tangibly stored on a computer readable program storage device, such as memory device 1220, such that a computer system can be directed to function in a particular manner.

Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

APPENDIX

Line:

```
1: loop
2:    (E,V, h,t) ← Q.pop              //Pop event E with potential V, time step h,
                                      //and scheduled time t, from time-ordered queue Q
3.    ξ := stencil(E)                 //global indices of the local stencil
4.    for i ∈ ξ do
5.        x_i ← x_i + (t − t_i)ẋ_i    //advance vertex to current time
6.        t_i ← t                     //update vertex's clock
7.    end for
8.    if E is a (external, internal, contact) force event then
9.        q̇_ξ ← q̇_ξ − hM_ξ^{−1}∂V/∂q_ξ   //local impulses, local mass
10.       Q.push(E, V, h, t + h)      //Return the event to the queue, with new time 11.              i∈ξ
          for j ∈ ⋃ contingent(i) do 12.           s ← failureTime(E_j)    //compute new event time
13.           Q.update(E_j, s)        //reschedule the contingent event
14.       end for
15.   else if E is certificate failure then
16.       update KDS certificate, reschedule in Q
17.       (de)activate penalty forces
18.   end if
19. end loop
```

What is claimed is:

1. An apparatus for simulating contact between objects comprising:
   one or more processors; and
   a program storage device having a program of instructions executable by the one or more processors, the program of instructions comprising:
   computer readable program code configured to simulate a plurality of objects in one or more contact scenarios with:
   a collision detection method guaranteeing geometric safety such that simulated object collision events are not missed and object interpenetration is prohibited, wherein the collision detection method comprises use of kinetic data structures; and
   a collision response model and a time integration method that guarantee physical correctness such that simulated object collision events obey causality and physical conservation laws, wherein the time integration method comprises asynchronous variational integrators, wherein the collision response model is based on a barrier potential defined as a monotonically increasing divergent function, and wherein computational progress is guaranteed via culling inactive forces such that simulation of the simulated object collision events completes in finite time.

2. The apparatus according to claim 1, wherein the collision detection method guarantees that, prior to concluding the simulation, no simulated object collision events go undetected.

3. The apparatus according to claim 1, wherein the time integration method belongs to a class of geometric integrators comprising at least one of symplectic and time reversible.

4. The apparatus according to claim 1, wherein the collision response model preserves correctness of a correct physical model, and wherein the collision response model is safe in that the collision response model prevents any detectable interpenetrations.

5. The apparatus according to claim 1, wherein the barrier potential comprises a piecewise function with c1 continuity at each transition point;
   wherein each piece of the function is polynomial; and
   wherein each polynomial is quadratic.

6. The apparatus according to claim 1, wherein:
   the computer readable program code is further configured to guarantee safety using kinetic data structures.

7. A method comprising:
   utilizing one or more processors to execute a program of instructions for simulating a plurality of objects in one or more contact scenarios, the program of instructions comprising:
   computer readable program code configured to simulate a plurality of objects in one or more contact scenarios with:
   a collision detection method guaranteeing geometric safety such that simulated object collision events are not missed and object interpenetration is prohibited, wherein the collision detection method comprises use of kinetic data structures; and
   a collision response model and a time integration method that guarantee physical correctness such that simulated object collision events obey causality and physical conservation laws, wherein the time integration method comprises asynchronous variational integrators, wherein the collision response model is based on a barrier potential defined as a monotonically increasing divergent function, and wherein computational progress is guaranteed via culling inactive forces such that simulation of the simulated object collision events completes in finite time.

8. The method according to claim 7, wherein the collision detection method guarantees that, prior to concluding the simulation, no simulated object collision events go undetected.

9. The method according to claim 7, wherein the time integration method belongs to a class of geometric integrators comprising at least one of symplectic and time reversible.

10. The method according to claim 7, wherein the collision response model preserves correctness of a correct physical model, and wherein the collision response model is safe in that the collision response model prevents any detectable interpenetrations.

11. The method according to claim 7, wherein barrier potential comprises a piecewise function with c1 continuity at each transition point;
wherein each piece of the function is polynomial; and
wherein each polynomial is quadratic.

12. The method according to claim 7, wherein:
the computer readable program code is further configured to guarantee safety using the kinetic data structures.

13. A computer program product comprising:
a non-transitory computer readable storage device having computer readable program code embodied therewith, the computer readable program code comprising:
computer readable program code configured to simulate a plurality of objects in one or more contact scenarios with:
a collision detection method guaranteeing geometric safety such that simulated object collision events are not missed and object interpenetration is prohibited, wherein the collision detection method comprises use of kinetic data structures; and
a collision response model and a time integration method that guarantee physical correctness such that simulated object collision events obey causality and physical conservation laws, wherein the time integration method comprises asynchronous variational integrators, wherein the collision response model is based on a barrier potential defined as a monotonically increasing divergent function, and wherein computational progress is guaranteed via culling inactive forces such that simulation of the simulated object collision events completes in finite time.

14. An apparatus for simulating contact between objects comprising:
one or more processors; and
a program storage device having a program of instructions executable by the one or more processors, the program of instructions comprising:
computer readable program code configured to simulate a plurality of objects in one or more contact scenarios with:
a collision detection method guaranteeing geometric safety such that simulated object collision events are not missed and object interpenetration is prohibited by using certificates in progressing simulated motion for the plurality of objects asynchronously in discrete time steps, wherein the collision detection method comprises use of kinetic data structures; and
a collision response model and a time integration method that guarantee physical correctness such that simulated object collision events obey causality and physical conservation laws via simulating contact between simulated objects employing a barrier potential comprised of penalty layers which simulate application of force to a simulated object as it approaches another simulated object in a contact scenario, wherein computational overhead is reduced by accounting for only a subset of penalty layers which are active at a given discrete time step in the simulation;
wherein the time integration method comprises asynchronous variational integrators, wherein the collision response model is based on a barrier potential defined as a monotonically increasing divergent function.

* * * * *